United States Patent [19]

Tomoda et al.

[11] Patent Number: 4,763,121

[45] Date of Patent: Aug. 9, 1988

[54] KEYLESS ENTRY SYSTEM FOR AUTOMATICALLY OPERATING AUTOMOTIVE DOOR LOCKING DEVICES WITHOUT MANUAL OPERATION

[75] Inventors: Takahisa Tomoda; Mikio Takeuchi; Kinichiro Nakano; Motoki Hirano, all of Kanagawa, Japan

[73] Assignee: Nissan Motor Company, Limited, Kanagawa, Japan

[21] Appl. No.: 895,370

[22] Filed: Aug. 11, 1986

[30] Foreign Application Priority Data

Aug. 12, 1985 [JP] Japan ................................ 60-177289

[51] Int. Cl.⁴ ......................... H04Q 9/00; B60Q 1/00; E05B 49/00

[52] U.S. Cl. ........................ 340/825.540; 340/825.690

[58] Field of Search ....................... 340/825.54, 825.31, 340/825.69, 825.72, 542, 64; 361/172

[56] References Cited

U.S. PATENT DOCUMENTS

| | | | |
|---|---|---|---|
| 3,891,980 | 6/1975 | Lewis et al. | 340/825.31 |
| 4,189,712 | 2/1980 | Lemelson | 340/825.31 |
| 4,196,347 | 4/1980 | Hadley | 340/825.31 |
| 4,317,157 | 2/1982 | Eckloff | 340/825.69 |
| 4,354,189 | 10/1982 | Lemelson | 340/825.31 |
| 4,486,806 | 12/1984 | Muchida et al. | 361/172 |
| 4,598,275 | 7/1986 | Ross et al. | 340/825.31 |

FOREIGN PATENT DOCUMENTS 59-24075 2/1984 Japan .

*Primary Examiner*—Donald J. Yusko

*Attorney, Agent, or Firm*—Foley & Lardner, Schwartz, Jeffery, Schwaab, Mack, Blumenthal & Evans

[57] ABSTRACT

A keyless entry system allows fully automatic operation of a door lock device of an automotive vehicle. The system recognizes the presence and absence of an authorized user and automatically locks or unlocks the vehicle door lock device according to the presence or absence of the authorized user. The keyless entry system is provided with a controller mounted on a vehicle and designed to periodically generate a radio demand signal and transmit same at regular intervals. A radio code signal transmitter is normally in a stand-by state in which it is ready to transmit a radio code signal indicative of a preset code in response to the radio demand signal. The radio code signal transmitter is of a pocket-portable size for convenient transport by an authorized user. The radio signal transmission between the controller and the radio code signal transmitter is performed within a predetermined distance range around the vehicle. Therefore, the radio code signal transmitter becomes active when the authorized user carrying the same enters into the predetermined radio signal transmission range to transmit the radio code signal to the controller. The controller receives and compares the preset code with a unique code stored in its memory and operates a door lock device for unlocking when the codes match. On the other hand, while the authorized user is output of the radio signal transmission range, the controller detects absence of the radio code signal to operate the door lock device for locking.

21 Claims, 7 Drawing Sheets

KEYLESS ENTRY SYSTEM FOR AUTOMATICALLY OPERATING AUTOMOTIVE DOOR LOCKING DEVICES WITHOUT MANUAL OPERATION

BACKGROUND OF THE INVENTION

The present invention relates generally to a keyless entry system designed to automatically operate a door lock device of an automotive vehicle without the need for any manual operations whatsoever. More specifically, the invention relates to a novel door lock device operating system which allows a possessor of a transmitter transmitting a preset code corresponding to a preset code in a vehicle-mounted controller to lock and unlock the door lock device without any manual operations. Further particularly, the invention relates to a novel and useful keyless entry system which recognizes the presence or absence of the possessor of a radio code transmitter and fully automatically locks and unlocks the door depending upon the presence or absence of the possessor.

Recently, a new keyless entry system for automotive vehicles has been proposed and put on the market. This system does not require mechanical key operation or manual entry of a preset code to operate various vehicle devices, such as the vehicle door lock, and trunk lid opener and so forth. In this keyless entry system, a pocket-portable transmitter is used as a source of a preset code signal. The transmitter generates radio waves carrying the preset code and transmits the encoded radio waves to a controller mounted on a vehicle. The controller receives the radio waves and separates the preset code from the radio waves. If the decoded code matches a preset code in the controller, the controller sends a control signal to the vehicle device to be operated.

This keyless entry system employing a radio code signal transmitter is very convenient in that it requires a single push-button operation to operate various vehicle devices such as a door lock device, a trunk lid opener and so forth. However, it would be more convenient if the vehicle devices could be operated without the need for any manual operations.

SUMMARY OF THE INVENTION

Therefore, it is an object of the present invention to provide a more advanced keyless entry system which allows fully automatic operation of a door lock device of an automotive vehicle.

Another object of the invention is to provide a novel and useful keyless entry system which can recognize the presence or absense of an authorized user and automatically locks and unlocks the vehicle door lock device according to the presence or absense of the authorized user.

A further object of the invention is to provide a keyless entry system which can detect the absence of the authorized user, whereupon it locks the vehicle door.

In order to accomplish the aforementioned and other objects, a keyless entry system, according to the present invention, is provided with a controller mounted on a vehicle and designed to repeatedly transmit a radio demand signal at regular intervals. A radio code signal transmitter is normally in a stand-by state in which it is ready to transmit a radio code signal indicative of a preset code in response to the radio demand signal. The radio code signal transmitter is of pocket-portable size for conveniently transport by an authorized user. The radio signal transmission between the controller and the radio code signal transmitter is effective within a predetermined range around the vehicle. Therefore, the radio code signal transmitter is activated to transmit the radio code signal to the controller when the authorized user enters the predetermined radio signal transmission range. The controller receives and compares the preset code in the radio code signal from the radio code signal tramsitter and unlocks the door via a door lock device when the codes match. On the other hand, while the authorized user is outside of the radio signal transmission range, the controller detects the absence of the radio code signal and actuates the door lock device to lock the door.

With this arrangement, the keyless entry system according to the present invention allows fully automatic door lock device operation for the authorized user.

According to one aspect of the invention, a keyless entry system for an automotive door lock comprises a door lock actuator for operating the door lock between a first locking position and a second locking position, a pocket-portable radio code signal transmitter transmitting a radio code signal containing an unique code which identifies the transmitter, the radio code signal transmitter being responsive to a radio demand signal to be activated for transmitting the radio code signal, and a controller mounted on a vehicle and electrically connected to the door lock actuator for controlling operation of the actuator for operating the door lock between the first locking position and the second unlocking position, the controller transmitting the radio demand signal at a given timing, receiving the radio code signal transmitted from the radio code signal transmitter, and operating the door lock actuator to hold the door lock at the first locking position while the radio code signal is absent.

The keyless entry system further comprises a manually opeable switch mounted on the external surface of a vehicle body and associated with the controller, the manually operable switch temperarily triggers the controller for transmitting the radio demand signal irrespective of the given timing.

In the alternative, the keyless entry system further comprises a detector for detecing a predetermined disabling condition for disabling the keyless entry system when the predetermined disabling condition is detected. The detector detects an ignition key in a key cylinder.

Furthermore, the keyless entry system may further comprise an elapsed time, the timer being reset and started cyclically at a timing determined relative to transmission of the radio demand signal for measuring a given period of time, and the controller operates the door lock actuator when the radio code signal is absent within the given period of time.

On the other hand, the controller is responsive to the radio code signal for operating the door lock actuator to operate the door lock to the second unlocking positon. The controller controls the door lock actuator to hold the door lock at the second unlocking position while the radio code signal present.

According to another aspect of the invention, a keyless entry system for an automotive door lock comprises a door lock actuator for operating the door lock between a first locking position and a second locking position, a manually operable switch mounted on an external surface of a vehicle body for manual operation from the outside of the vehicle, a pocket-portable radio code signal transmitter transmitting a radio code signal containing an unique code which identifies the transmitter, the radio code signal transmitter being responsive to a radio demand signal to be activated for transmitting the radio code signal, a controller mounted on a vehicle and electrically connected to the door lock actuator for controlling operation of the actuator for operating the door lock between the first locking position and the second unlocking position and to the manually operable switch, the controller regularly transmitting the radio demand signal at a given timing and being responsive to manual operation of the manually operable switch for temperarily transmitting the radio demand signal irrespective of the given timing, receiving the radio code signal transmitted from the radio code signal transmitter, comparing the unique code in the received radio code signal with a preset code to operate the door lock actuator to operate the door lock to the second unlocking position when the unique conde and the preset code match, and operating the door lock actuator to hold the door lock at the first locking position while the radio code signal is absent.

DESCRIPTION OF THE PREFERRED EMBODIMENT

Figure 1:
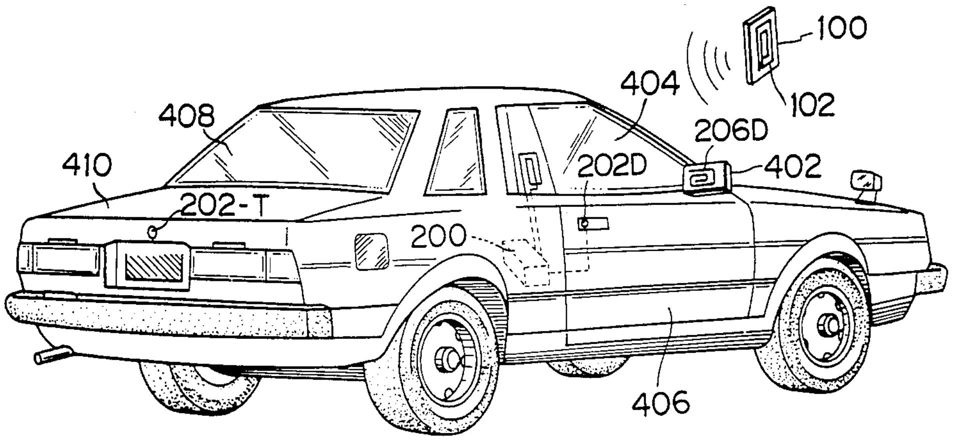
FIG. 1 is a perspective view of a vehicle to which a preferred embodiment of a keyless entry system in accordnce with the present invention is applied.
Figure 2:
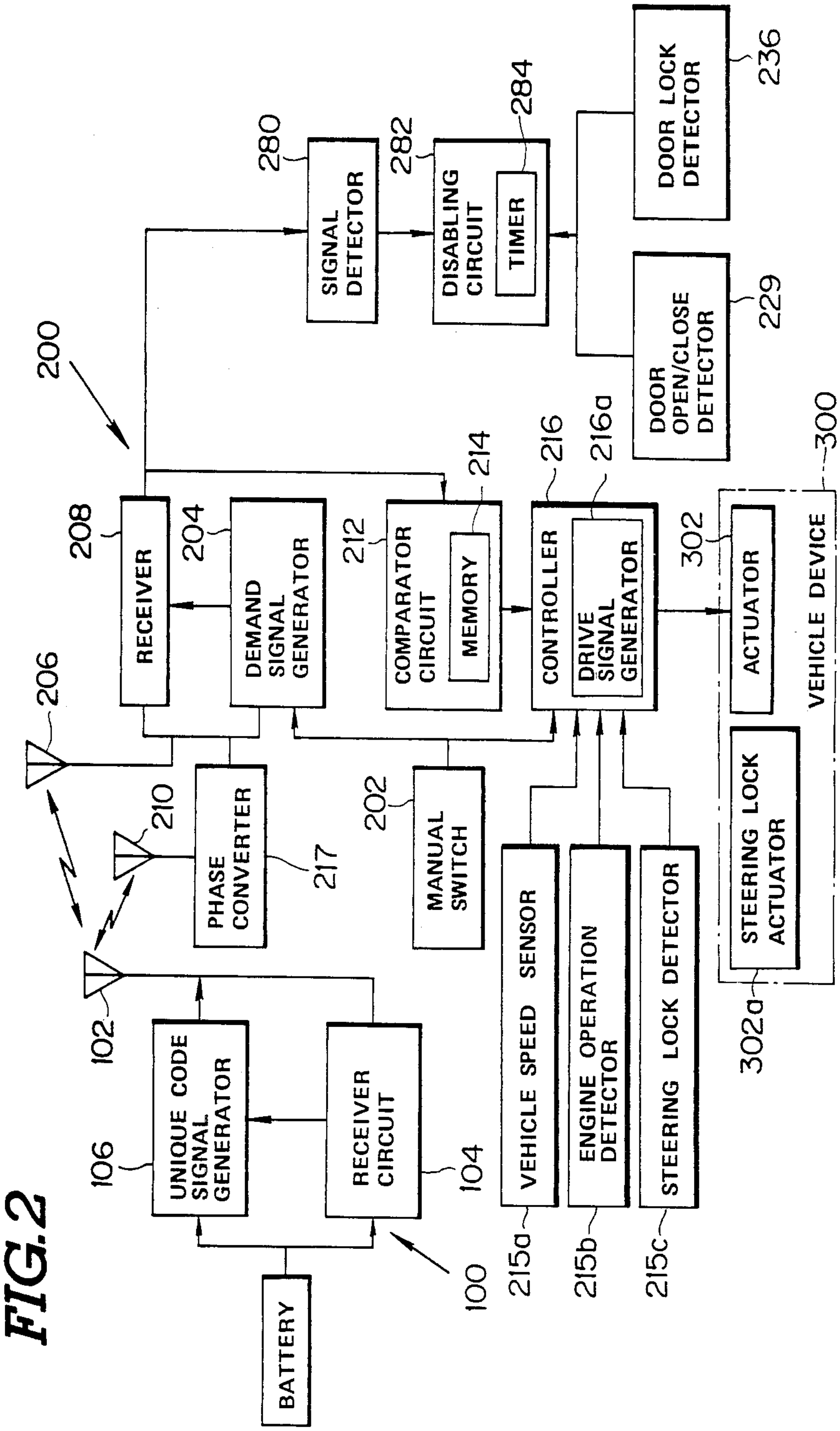
FIG. 2 is a block diagram of the general circuit arrangement of the preferred embodiment of the keyless entry system according to the invention.

Referring now to the drawings, FIGS. 1 and 2 show the general structure of the preferred embodiment of a keyless entry system according to the present invention. As shown in FIG. 1, the preferred embodiment of the keyless entry system of the present invention generally comprises a compact radio code signal transmitter 100 which is comparable in size with common bank or credit cards and so can be easily carried in a clothing pocket, and a controller 200 mounted on a vehicle. The controller 200 is connected with push-button-type manual switches 202 mounted on the outer surface of the vehicle body. The manual switches 202 are each located near the corresponding vehicle devices 300. In order to facilitate keyless operation, each of the vehicle devices is associated with corresponding actuator 302. In the shown embodiment, the keyless entry system is designed to operate a door lock and a trunk lid lock. Therefore, the manual switch 202-D for the door lock is mounted on the vehicle door 406. On the other hand, the manual switch 202-T for the trunk lid lock is mounted on the trunk lid 410 at an appropriate location near the trunk lid lock.

The shown embodiment of the keyless entry system is also designed to operate a steering locking mechanism. The steering locking mechanism includes a steering lock actuator **302*a***.

The radio code signal transmitter 100 has a thin, rectangular casing 101 on which a loop antenna 102 is provided. A loop antenna 206-D is mounted near enough the manual switch 202-D for the user to be able to depress the manual switch 202-D while holding the radio code signal transmitter 100 within broadcast range of the loop antenna 206-D

The fundamental idea of the keyless entry system will be discussed with reference to FIG. 2. The manual switch 202 serves to request operation of the vehicle device 300. Furthermore, in accordance with the preferred embodiment of the keyless entry system of the invention, it is facilitated full-automatic door lock operation for allowing the user who is carrying the radio code signal transmitter 100 to lock and unlock the door lock. The controller 200 is thus cyclically produces a radio signal for activating the radio code signal transmitter 100 at regular intervals, which radio signal transmitted by the controller has a specific frequency and will be hereafter referred to as "radio demand signal ". The controller 200 is also responsive to depression of the manual switch 202 to produce the radio demand signal. A radio demand signal generator 204 in the controller produces the radio demand signal cyclically at regular intervals and temporarily in response to depression of the manual switch 202. The radio demand signal is transmitted by a transmitter antenna 206. The transmitter antenna 206 may be mounted on the external surface of the vehicle body near the vehicle device 300 to be operated. For example, if the vehicle device 300 to be operated were the left-front door lock, the radio code signal transmitter antenna 206 might then be mounted on the window pane of the left-front door or on a mirror mounted on the left-front door. In practice, the transmitter antenna 206 will be a loop-antenna printed on the chosen area of the vehicle or disposed in an appropriate space on the vehicle body.

It should be appreciated that, in practice, the preferred embodiment of the keyless entry system according to the present invention is designed to operate various vehicle devices including the door lock. Therefore, a plurality of manual switches are arranged near the respective vehicle devices to be operated. As set forth above, a plurality of antennas are provided near corresponding manual switches. In order to facilitate fully automatic operation of the door lock, the controller 200 is designed to transmit the radio demand signal repeatedly at regular intervals through the antenna corresponding to the door lock. On the other hand, to temporarily operate the door lock or to operate other vehicle devices, the corresponding manual switch must be depressed. In this case, the controller 200 is responsive to manual operation of the corresponding switches to tranmit the radio demand signal through the antenna associated with the depressed manual switch.

The radio code signal transmitter 100 also has a transmitter/receiver antenna 102 which may be a loop-antenna printed on the outer surface of a radio code signal transmitter casing. The antenna 102 is connected to a receiver circuit 104 of the radio code signal transmitter 100 to receive the demand signal from the controller. The receiver circuit 104 is, in turn, connected to a unique signal generator 106 which generates a radio signal indicative of a unique combination of several digits in binary code. The radio signal produced by the unique signal generator 106 will be referred to hereafter as "unique code indicative radio code signal" or "radio code signal". The code indicated by the radio code signal is unique for each radio code signal transmitter 100 and serves to identify the radio code signal transmitter. The radio code signal of the radio code signal generator 106 is transmitted by the antenna 102.

A receiver 208 with a receiver antenna 210 is provided in the controller 200 to receive the radio code signal from the radio code signal transmitter 100. The receiver antenna 210 is also mounted on the external surface of the vehicle body near the transmitter antenna 206. The receiver 208 is connected to the radio demand signal generator 204 and responsive to the radio demand signal to be activated for a predetermined period of time. In other words, the receiver 208 is active for the predetermined period of time after the radio demand signal is transmitted. Signals received within the predetermined period of time are converted into binary code signals indicative of any and all digits encoded in the signal as they would be in the radio code signal transmitter 100. The receiver 208 sends the converted binary code signal to a comparator circuit 212. The comparator circuit 212 includes a memory 214 storing a preset code which matches the unique code of the radio code signal transmitter 100. The comparator circuit 212 compares the binary-coded digits from the receiver 208 with the preset code and produces a HIGH-level comparator signal when the codes match. A controller 216 including a driver signal generator **216*a* is responsive to the HIGH-level comparator signal produced by the comparator circuit 212 to produce a driver signal for an actuator 302** in the vehicle device.

In the shown embodiment, the controller 216 is designed to detect vehicle conditions satisfying predetermined steering lock conditions. In the preferred embodiment, keyless steering lock operation is performed when the vehicle is at rest, the engine is not running and the unique code matches the preset code. In order to test these conditions, the controller 216 receives signals from a vehicle speed sensor **215*a* and an engine stop condition detector 215*b*. The vehicle speed sensor 215*a* produces a vehicle speed indicative signal. On the other hand, the engine operation detector detects when the engine is not running and produces an engine-off signal. The controller 216 is also connected to a steering lock detector 215*c*** which produces a steering locking condition indicative signal.

In cases where the keyless entry system is designed to operate more than one vehicle device, the controller 216 is also connected to the manual switches 202 so as to be able to operate the corresponding vehicle devices. The controller 216 recognizes which of the manual switches 202 is operated and sends a driver signal to the actuator of the corresponding vehicle device.

In the aforementioned arrangement, the radio code signal transmitter 100 uses a small, long-life battery 108 as a power source. In practice, a mercury battery or its equivalent could be used in the radio code signal transmitter. On the other hand, the controller 216 uses a vehicle battery 218 as a power source. The aforementioned keyless entry system according to the present invention achieves conservation of battery power by being operative only when the manual switch is operated. It would be convenient to provide a weak battery alarm in the system. A suitable weak battery-alarm feature for a keyless entry system has been disclosed in the co-pending U.S. patent application Ser. No. 651,783 filed on Sept. 18, 1984, commonly assigned to the assignee of the present invention. The disclosure of this co-pending U.S. patent application is hereby incorporated by reference for the sake of disclosure.

The receiver 208 is also connected to a signal detector 280 which detects reception of the radio code signal from the radio code signal transmitter 100. The signal detector 280 sends a detector signal to a disabling circuit 282 as long as the presence of the unique code signal is detected. The disabling circuit 282 is also connected to a door closure detector 229 and a door lock detecting switch 236. The disabling circuit 282 incorporates a timer 284 for measuring elapsed time from operation or depression of the one of the manual switches 202-D or 202-T. The disabling circuit 282 responds to the presence of the detector signal after a predetermined period of time, given that all of the doors are closed and locked as indicated by the door closure detector and the door lock detecting switch, to produce a disabling signal. The disabling signal disables production of the driver signal by the driver signal generator 216. On the other hand, while the driver signal generator 216 is disabled, the disabling circuit 282 is responsive to opening of one of the doors to stop the disabling signal and resume keyless entry operation.

In summary, the radio code signal transmitter is recognized to be locked in the vehicle when all of the doors are closed and locked and the unique code signal from the radio code signal transmitter is received continuously for a period longer than a preset period of time. The preset period of time is determined empirically such that the period is long enough for the user to move out of transmission range but short enough that the user will still be able to hear the alarm indicating that the radio code signal transmitter is about to be left in the vehicle. In order to enable the user to unlock the door in order to remove the radio code signal transmitter from the vehicle, the system remains operative for a few minutes, which should be long enough for the user to return to the vehicle and to operate the manual switch for the door lock. If the user fails to notice the alarm and therefore does not operate the keyless entry system to unlock the door and remove the radio code signal transmitter from the vehicle, the keyless entry system is rendered inoperative after those few minutes to inhibit keyless entry operation until the door is unlocked by means of a mechanical key.

This satisfactorily and successfully prevents the vehicle from being stolen by simple operation of the manual switch while the radio code signal transmitter is in the vehicle.

The present invention will be described in more detail in terms of the preferred embodiment of the invention with reference to FIGS. 2 to 4.

Figure 3:
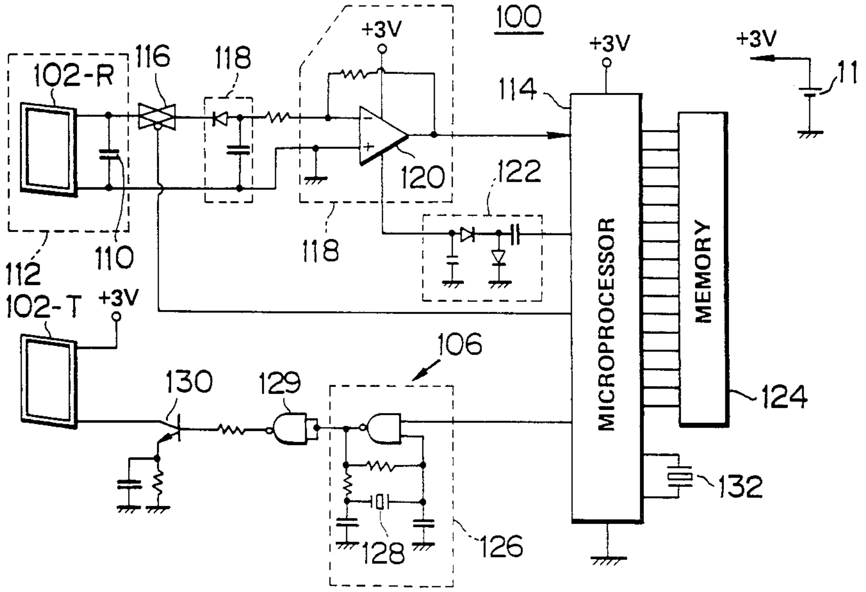
FIG. 3 is a schematic circuit diagram of a radio code signal transmitter in the preferred embodiment of keyless entry system of FIG. 2.

As shown in FIGS. 2 and 3, as in the controller 200, the radio code signal transmitter 100 is provided with a pair of loop antennas 102-R and 102-T which are printed on the outer surface of the radio code signal transmitter casing (not shown) or installed in the internal space of the radio code signal transmitter casing. The antenna 102-R is connected to the receiver circuit 104 and serves as a receiver antenna. On the other hand, the antenna 102-T is connected to the radio code signal generator 106 and serves as a radio code signal transmitter antenna. A capacitor 110 is connected in parallel with the receiver antenna 102-R to form a passive antenna circuit 112. The antenna circuit 112 captures by electromagnetic induction the radio demand signal from the controller 200 produced in response to depression of one of the manual switches 202.

The antenna circuit 112 is connected to a microprocessor 114 via an analog switch 116, a detector circuit 118 and an amplifier 120. A negative power supply circuit 122 is inserted between an outer terminal of the microprocessor 114 and the amplifier 120 to invert a 0 or +3V binary pulse output from the microprocessor into a 0 to −3V input to the amplifier. This negative power is supplied to the amplifier to adjust the bias point of the amplifier to 0V.

The microprocessor 114 is connected to a memory 124 storing the preset unique code. In practice, the memory stores four predetermined, four-bit, BCD digits. The memory 124 can be a ROM pre-masked with the preset code. However, in order to minimize the cost, it would be advantageous to use a circuit in the form of a printed circuit board including circuit elements corresponding to each bit. When the circuit element is connected, it is indicative of "1" and when the circuit element is cut or disconnected, it is indicative of "0". By this arrangement, the preset code may be input simply to the microprocessor 114.

The microprocessor 114 is designed to be triggered by the radio demand signal from the controller 200, i.e., input to the microprocessor 114 through the antenna 102-R, the analog switch 116, the detector circuit 118 and the amplifier 120 serves as the trigger signal for the microprocessor. In response to the trigger signal, the microprocessor 114 reads the preset unique code from the memory 124 and sends a serial pulse-form radio code signal indicative of the unique code to a modulator 126. The modulator 126 includes a crystal oscillator 128 for generating a carrier wave for the unique code signal. In the modulator 126, the radio code signal and the carrier wave are modulated into a radio signal in which the radio code signal rides on the carrier wave. The modulated radio signal is output through a buffer 129, a high-frequency transistor 130 and a transmitter antenna 102-T.

Another crystal oscillator 132 is connected to the microprocessor 114. The oscillator 132 may serve as a clock generator feeding clock pulses to the microprocessor.

In the above arrangement of the radio code signal transmitter, electric power is supplied to the components by a small, long-life-type lithium cell 134 such as are used in electronic watches. The microcomputer to be used for the radio code signal transmitter 100 is of the low-voltage CMOS type. The analog switch 118 and the amplifier 120 IC units are also chosen to be of the power-saving type. As a result, stand-by operation requires only about 4 to 5 mA. This means that the radio code signal transmitter 100 can be used for about one year before replacing the lithium battery.

Figure 4:
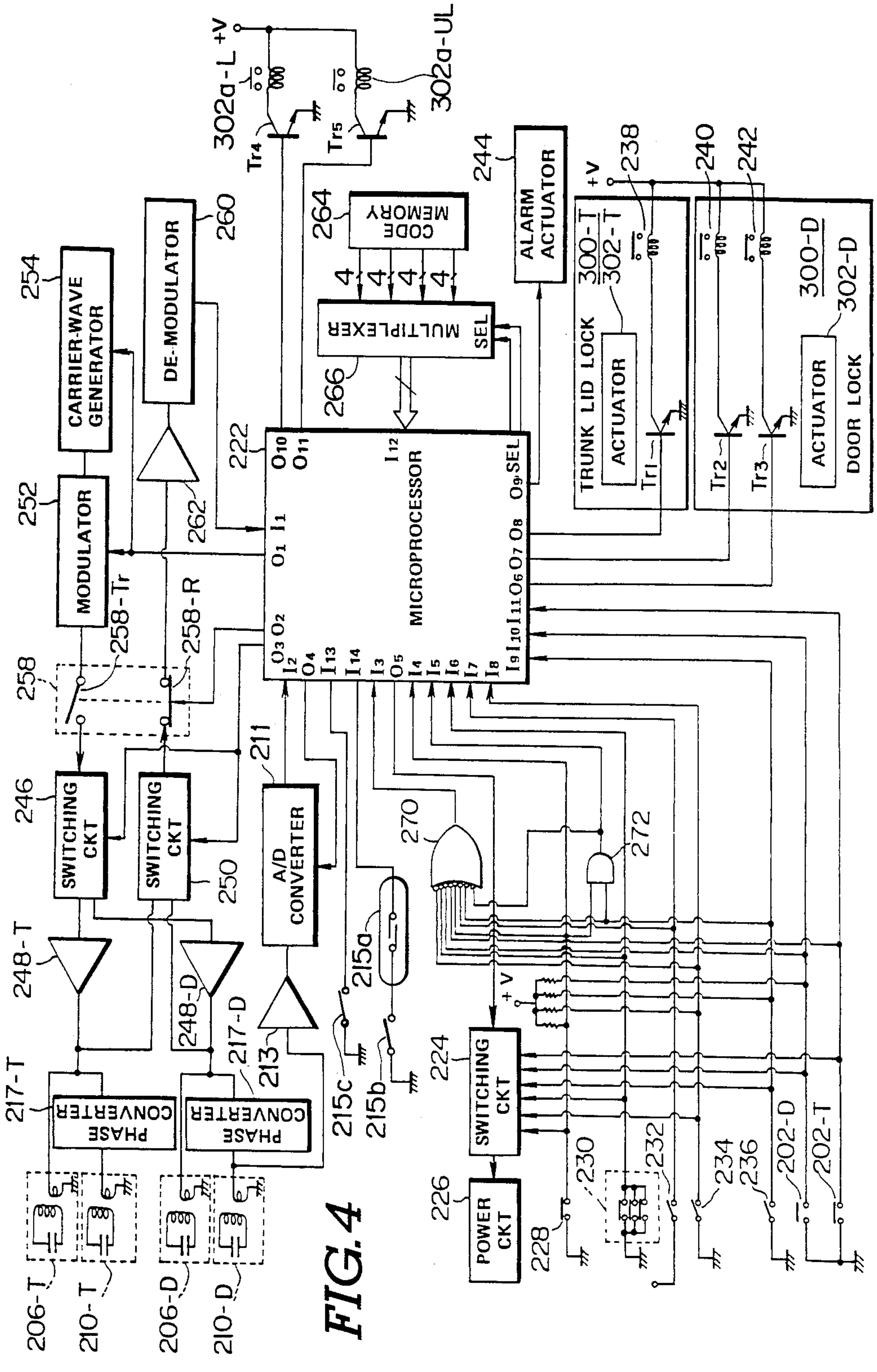
FIG. 4 is a schematic circuit diagram of a controller in the preferred embodiment of the keyless entry system of FIG. 2.
Figure 5:
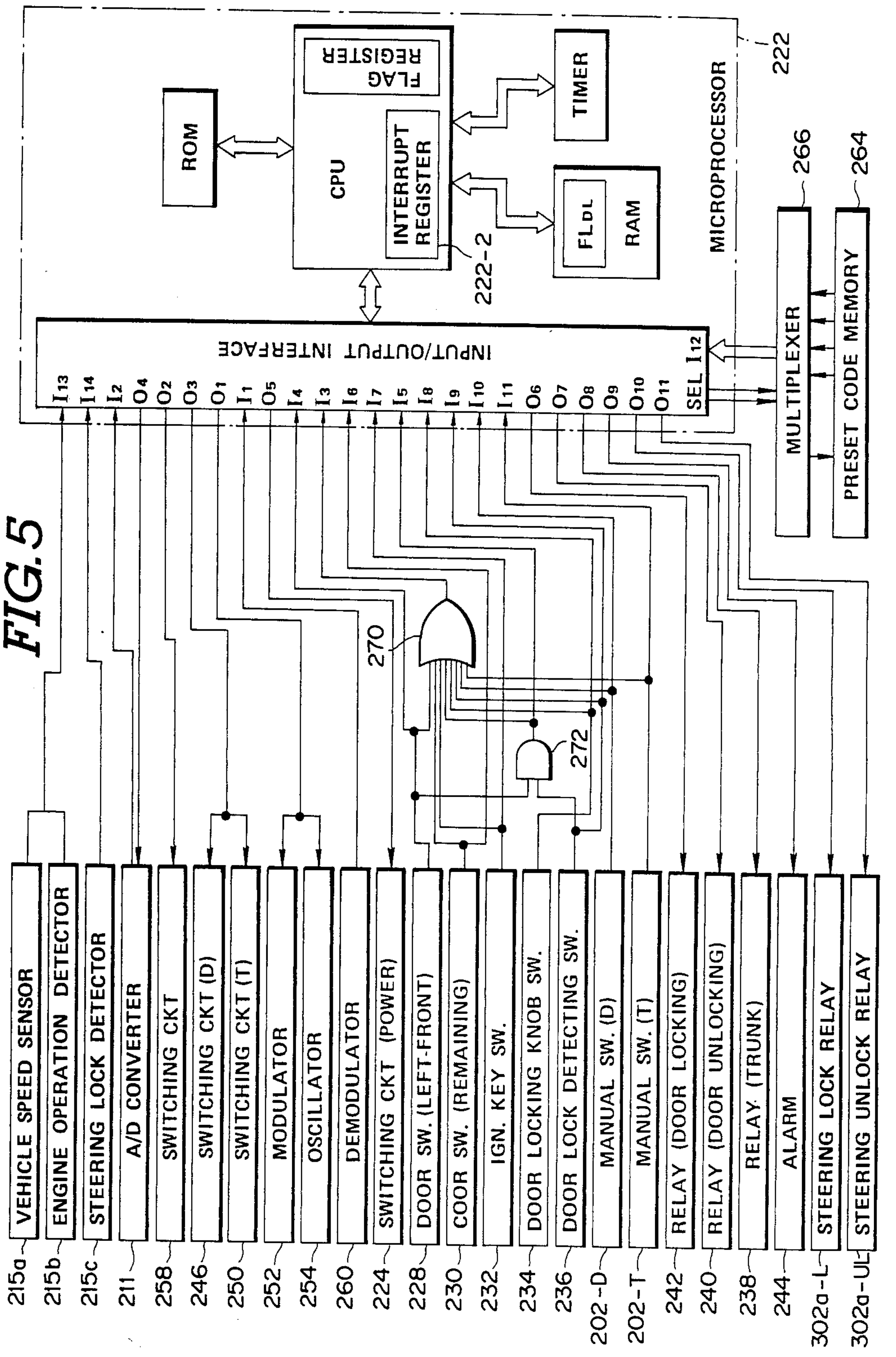
FIG. 5 is a block diagram showing details of a microprocessor in the controller of FIG. 4.

As shown in FIGS. 4 and 5, the controller 200 comprises a microprocessor 222 including an input/output interface, CPU, ROM, RAM, timer and so forth. In the shown embodiment, the microprocessor 222 is connected to manual switches 202-D and 202-T, which are respectively designed to operate the door lock and the trunk lid lock. However, it should be appreciated that the present invention is applicable for operating not only the door lock and trunk lid lock but also other vehicle devices, such as a steering lock, a glove-box lid lock and so forth. In the shown embodiment, the keyless entry system is designed to operate a door lock 300-D and a trunk-lid lock 300-T. Accordingly, the manual switch 202-D is connected to the controller 200 in order to operate the door lock 300-D and the manual switch 202-T is similarly operable when the trunk lid lock 300-T is to be operated. The manual switches 202-D and 202-T are connected to the input terminals $I_9$ and $I_{10}$ of the microprocessor 222. The manual switches 202-D and 202-T are also connected to a switching circuit 224 inserted between the output terminal $O_5$ of the microprocessor 222 and a power supply circuit 226.

The switching circuit 224 is also connected to a driver's door switch 228, passenger door switches 230, an ignition key switch 232, a door lock knob switch 234 and a door-lock-detecting switch 236. The driver's door switch 226 detects opening and closig of the left-front door adjacent the driver's seat and is closed while the left-front door is open. The passenger door switches 230, detects opening and closing of the right-front door and the rear doors. These switches 230 close when the corresponding door opens. The door switches are built and operated as conventionally utilized for door closure monitoring. Alternatively, it would be simpler to connect the switching circuit 224 to conventional door switches.

The ignition key switch 232 is installed within or near an ignition key cylinder and detects the presence of an ignition key in the key cylinder. The ignition key switch 232 is closed while the ignition key is within the key cylinder.

The door lock knob switch 234 is responsive to a manual door locking operation by which the door lock of the driver's door is manually operated in the door-locking direction. The door lock knob switch 234 closes when the door lock knob is operated manually to perform door locking. The door lock detecting switch 236 detects the locking state of the door lock; specifically the switch 236 is closed while any of the door locks are unlocked and is open when all of the door locks are in their locking positions.

The switching circuit 224 is responsive to closure of any one of the switches 202-D, 202-T, 228, 230, 232, 234 and 236 to trigger the power supply circuit 226 for a given period of time. The power supply circuit 226 is active for the given period of time to supply a vehicle battery power to the various components of the controller circuit. In addition, the switching circuit 224 is responsive to high-level output from the output terminal $O_5$ of the microprocessor 222 to be held active and thus sustain operation of the power supply circuit 226 as long as the high-level output continues. The switching circuit 224 deactivates the power supply circuit when the output level of the output terminal $O_5$ drops from high to low.

The microprocessor 222 has input terminals in its input/output interface to be connected to the driver's door switch 228, the passenger door switch 230, the ignition key switch 232, the door lock knob switch 234 and a door-lock-detecting switch 236. Also, the microprocessor 222 is connected to the steering lock detector 215*c*, the engine stop condition detector 215*b* and the vehicle speed detector 215*a*.

Output terminals $O_6$, $O_7$ and $O_9$ of the microprocessor 222 are respectively connected to actuator relays 238, 240 and 242 via switching transistors $Tr_1$–$TR_3$. The actuator relay 238 is associated with an actuator 302-T of the trunk lid lock 300-T. The actuator relays 240 and 242 are associated with an actuator 302-D of the door lock 300-D. In practice, the actuator 302-D comprises a reversible motor which actuates the door lock 3200-D to its locked position when driven in one direction and to its unlocked position when driven in the other direction. Two relays 240 and 242 are designed to reverse the polarity of power supply and thus switch the driving direction of the reversible motor. For instance, when the relay 240 is energized, the reversible motor 302-D is driven in the door-unlocking direction. On the other hand, when the relay 242 is energized, the reversible motor 302-D is driven in the door-locking direction. Therefore, the output level at the output terminal $O_7$ goes high when the door is to be unlocked and the output terminal $O_8$ goes high when the door is to be locked.

In addition, the microprocessor 222 has another output terminal connected to a steering lock relay 302*a*-L and a steering unlock relay 302*a*-UL through switching transistors Tr4 and Tr5.

The microprocessor 222 is programmed to execute a theft-preventive operation in response to a specific condition. For example, if the door switch is closed while the door lock detecting switch is open, a theft-preventive alarm signal is output via the output terminal $O_9$ which is connected to an alarm actuator 244. In practice, the alarm actuator 244 may be connected to a vehicular horn to activate the latter in response to the theft-preventive alarm signal. This theft-preventive operation in keyless entry systems has been disclosed in the European Patent First Publication No. 00 73 068, published on Mar. 2, 1983. The disclosure of this European Patent First Publication is herein incorporated by reference for the sake of disclosure. On the other hand, the theft-preventive operation could be performed by the microprocessor by counting erroneous operations within a given period of time.

The antennas 206-D and 210-D in the shown embodiment are located near the door locks and the trunk lid locks. As an example, the antenna 206-D may be applied to or printed on the reflective surface of a door mirror 402, as shown in FIG. 1. The antenna 210-D may be applied to or printed on a window pane 404 of the vehicle side door 406. On the other hand, the antennas 206-T and 210-T are mounted near the trunk lid lock and may be applied to or printed on the rear windshield 408, as shown in FIG. 1.

As shown in FIG. 4, the antennas 206-D and 210-D are coupled to transmit the radio demand signal $S_{DM}$ and receive the radio code signal $S_{CM}$ when the door lock 300-D is to be operated. The antenna 210-D is connected to a phase converter 217-D which shifts the phase of the radio code signal received via the antenna 210-D through 90°.

The antenna 210-D is also connected to an analog-to-digital converter (A/D converter) 211 through a high-frequency amplifier 213. The A/D converter 211 outputs a digital signal $S_{Rf}$ indicative of the received signal level to the input terminal $I_2$ of the microprocessor 222. The A/D converter 211 is also connected to the output terminal $O_4$ of the microprocessor 222 and is gated by a trigger signal output through the output terminal $O_4$. Similarly, the antennas 206-T and 210-T are coupled to transmit the radio demand signal to the radio code signal transmitter 100 and receive the radio code signal in return when operation of the trunk lid lock is requested via the manual switch 202-T. The antenna 210-T is connected to a phase converter 217-T which shifts the radio code signal phase received by the antenna 210-T through 90°.

The pairs of antennas 206-D, 210-D and 206-T, 210-T are connected for input from a switching circuit 246 through respectively corresponding high-frequency amplifiers 248-D and 248-T. The switching circuit 246 selectively activates one pair of antennas 207-D, 210-D or 206-T, 210-T to transmit the radio demand signal $S_{DM}$. For instance, when the manual switch 202-D is depressed to produce the radio demand signal $S_{DM}$ for operating the door lock 300-D, the antennas 206-D and 210-D become active to transmit the demand signal to the radio code signal transmitter. The signal phase of the radio demand signal transmitted through the antenna 210-D is shifted through 90° by means of the phase converter 217-D. On the other hand, when the manual switch 202-T is depressed, the switching circuit 246 selects the antennas 206-T and 210-T. Similarly to the above, the radio demand signal $S_{DM}$ is thus transmitted to the radio code signal transmitter 100 through the antennas 206-T and 210-T and the signal phase of the demand signal transmitted through the antenna 210-T is shifted through 90° by the phase converter 217-T.

The switching circuit 246 is connected for input from a modulator 252 via a switch terminal 258-Tr of a switching circuit 258. The modulator 252 is, in turn, connected for input from the output terminal $O_1$ of the microprocessor 222. Similarly, the switching circuit 250 is connected to demodulator 260 through a switch terminal 258-R of the switching circuit 258 and an amplifier 262. The switch terminals 258-Tr and 258-R are designed to alternate so that when the switch terminal 258-Tr is closed, the switch terminal 258-R is opened, and when the switch terminal-R is closed, the switch terminal 258-Tr is opened. When the switch terminal 258-Tr is closed, the controller 200 operates in radio code signal transmitter mode to transmit the radio demand signal $S_{DM}$. On the other hand, when the terminal 258-R is closed, the controller 200 operates in receiver mode to receive the unique code-indicative signal from the radio code signal transmitter 100.

The demodulator 260 is connected for output to the input terminal $I_1$ of the microprocessor 222.

The switching circuits 246 and 250 are connected to the output terminal $O_3$ of the microprocessor 222. The switching circuits 246 and 250 are operated in tandem to select one pair of antennas 206-D, 210-D or 206-T, 210-T. For instance, the switching circuit 246 connects the antennas 206-D and 210-D to the modulator via the switch terminal 258-Tr of the switching circuit 258 when the door lock operating manual switch 202-D is operated. At the same time, the switching circuit 250 connects the antennas 206-D and 210-D to the demodulator 260 through the switch terminal 258-R and the amplifier 262. Alternatively, when the trunk lid lock operating manual switch 202-T is operated, the switching circuit 246 connects the antennas 206-T and 210-T to the modulator 252 through the switch terminal 258-Tr and the switching circuit 250 connects the antennas 206-T and 210-T to the demodulator 260 via the switch terminal 258-R and the amplifier 262.

The modulator 252 is associated with an oscillator 254 which serves as a carrier-wave generator. The modulator 252 is triggered by the output at the output terminal $O_1$ of the microprocessor 222 to activate the carrier-wave generator 254 which then provides the fixed-frequency carrier wave. The modulator 252 modulates the carrier wave in accordance with the output from the output terminal $O_1$ to generate the radio demand signal $S_{DM}$ and then transmits same through the selected pair of antennas 206-D, 210-D or 206-T, 210-T. The demodulator 260 is designed to separate the carrier wave component from the received radio code signal $S_{CD}$ so as to convert the radio signal into a binary signal representative of the unique code stored in the radio code signal transmitter 100. The demodulator 260 applies the encoded binary signal to the input terminal $I_1$ of the microprocessor 222.

The microprocessor 222 is triggered by the input at the input terminal $I_1$ via the demodulator 260 to read a preset code from a preset code memory 264 via a multiplexer 266. The microprocessor 222 compares the unique code with the preset code read from the preset code memory 264 to judge whether the radio code signal tansmitter 100 identified by the unique code corresponds to the controller 200 and so is authorized to operate the vehicle devices. The microprocessor 222 outputs a driver signal through one of the output terminals $O_6$, $O_7$ and $O_8$ corresponding to the operated manual switch so as to operate the corresponding vehicle device, i.e. door lock or trunk lid lock, when the unique code matches the preset code.

It would be convenient for the preset code memory 264 to be an external memory connectable to the terminal of the multiplexer 266. In this case, the preset code memory 264 could be stored with the corresponding radio code signal transmitter 100 as a separate unit. The preset code memory 264 and the radio code signal transmitter 100 would be added to the vehicle upon sale so that the separate memory-and-transmitter unit would not be separated from the matching controller. In practice, the preset code memory is programmed by shorting some of a plurality of individual bit cells so as to have a binary output corresponding to the unique code.

The switching circuit 258 is connected to the output terminal $O_2$ of the microprocessor 222 through which a state change-over signal is output. The state change-over signal is indicative of whether the system is transmitting the radio demand signal or receiving the unique code-indicative radio signal from the radio code signal transmitter 100. In practice, the microprocessor 222 keeps the switching circuit 250 in the transmitting state for a given period of time in response to depression of one of the manual switches. Thereafter, the microprocessor 222 then switches the switching circuit 250 to the receiving state. Similarly to the switching circuit 246, the switching circuit 250 is connected to the output terminal $O_3$ of the microprocessor 222 to activate one of the antennas 210-D and 210-T according to which manual switch was depressed.

It should be appreciated that, in the preferred embodiment, the microprocessor 222 normally outputs the state change-over signal through the output terminal $O_2$ to the switching circuit 258 to connect the modulator 252 to the switching circuit 246 in order to hold the controller 200 in transmitter mode. Also, the microprocessor 222 sends an output through the output terminal $O_3$ to select the antennas 206-D and 210-D. In order to periodically transmit the radio demand signal $S_{DM}$ through the antennas 206-D and 210-D, the microprocessor 222 triggers the modulator 252 by the output at the output terminal $O_1$ at regular intervals. This defines the stand-by state of the controller 200 for detecting when the radio code signal transmitter 100 comes into the broadcasting range of the controller, whereupon the door lock is automatically unlocked.

Figure 6:
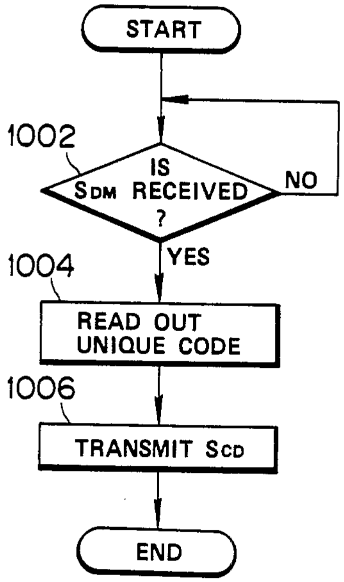
FIG. 6 is a flowchart of a program executed by the microprocessor in the radio code signal transmitter of FIG. 3.

FIG. 6 illustrates the operation of the radio code signal transmitter 100 in the form of a flowchart for a program executed by the microprocessor 114. The microprocessor 114 repeatedly executes the program of FIG. 6. An initial block 1002 checks for reception of the radio demand signal SDM. Execution of the block 1002 loops until the radio demand signal SDM is received through the antenna 102. Upon receipt of the radio demand signal SDM at the block 1002, control passes to a block 1004. In the block 1004, the preset unique code is read from the code memory 124. At a block 1006, a carrier wave produced by a carrier-wave generator 128 is modulated by the unique code signal generator 106 in accordance with the retrieved code to produce the radio code signal. The modulated radio code signal $S_{CD}$ is then transmitted through the antenna 102 to the controller 200 mounted on the vehicle. As set forth above, according to the shown embodiment, the radio code signal transmitter 100 is designed to consume minimal electric power, particularly during stand-by operation at the block 1002. This minimizes the drain on the battery and thus prolongs its life time.

The microprocessor 222 may be provided with a conventional interrupt register 222-2 consisting of flags indicative of occurrence of triggering inputs at each the input terminals $I_4$, $I_{10}$, $I_5$, $I_8$ and $I_9$ in order of priority or occurrence of input. The contents of the register 222-2 are checked in sequence during execution of the main program following the end of each sub-routine. For instance, when the driver's door is closed, the input level at the input terminal $I_4$ goes low the interrupt flag in register 222-2 corresponding to the input terminal $I_4$ is set. This interrupt signalling method is per se well known and can be carried out in various ways. For example, as used in the preferred embodiments, interrupts may be either maskable, i.e. delayable until some other process is completed, or nonmaskable, i.e. triggering immediate execution of an associated routine in preference to all other operations.

Similarly, when the door lock operating manual switch 202-D is operated, the input level at the input terminal $I_{10}$ changes from high to low. Then, the corresponding flag in the register 222-2 is set to reflect the triggering change in input level at the input terminal $I_{10}$ to signal execution of the second sub-routine. When the driver's door is opened and the door lock is operated to the locking position in preparation to locking the door, the door lock detecting switch 236 closes and the output signal from a series-connected AND gate 272 goes low. When the door lock is manually unlocked, the door lock knob switch 234 closes to change the input level at the input terminal $I_8$ to the low level. When the all of the doors are locked and thus the door lock detecting switch 236 closes, the input level at the input terminal $0_9$ goes low.

Figure 7:
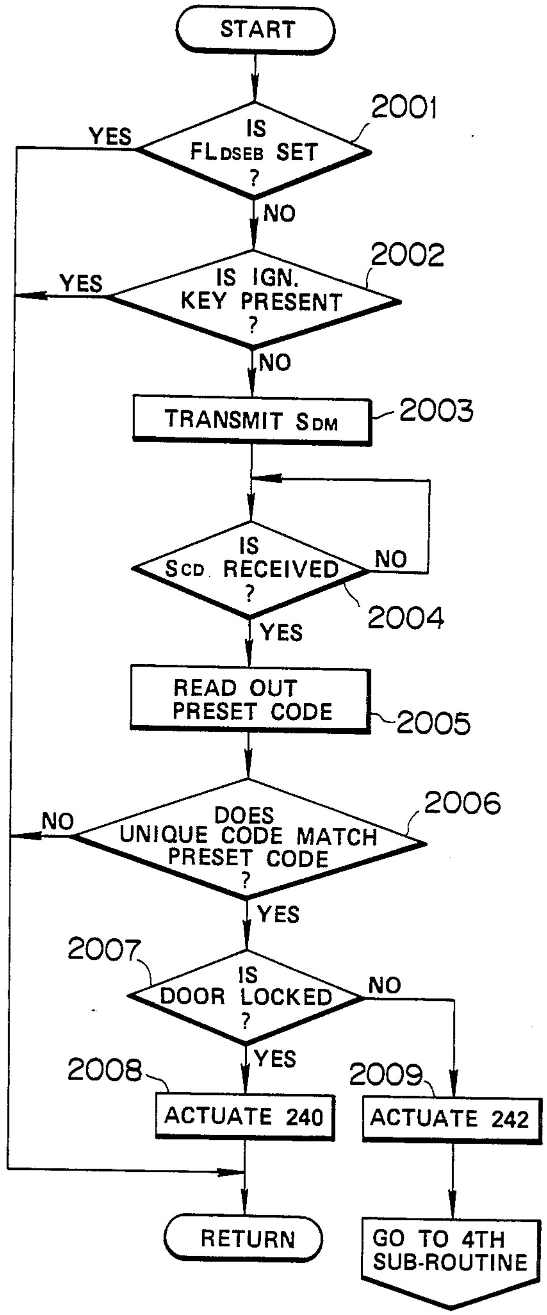
FIG. 7 is a flowchart of a main program to be executed by the microprocessor of the controller of FIGS. 4 and 5.

FIG. 7 is a flowchart of a program to be executed by the controller 200. The controller 200 is triggered to execute the program of FIG. 7 periodically as part of the stand-by state for automatic door locking and unlocking and in response to a low-level input at the input terminal $I_{10}$ caused by operating the door lock manual switch 202-D. At an initial stage of execution of the program of FIG. 7, a disabling flag $FL_{DSEB}$ is checked at a block 2001, which disabling flag is set in a flag register 274 in the CPU when the controller 200 is disabled and is reset as long as the controller is enabled. If the disabling flag $FL_{DSEB}$ is set when checked at the block 2001, the routine of FIG. 18 ends immediately and control returns to the main program.

On the other hand, if the disabling flag $FL_{DSEB}$ is reset when checked at the block 2001, the presence of an ignition key (mechanical key) in the key cylinder (not shown) is checked for at a block 2002. In practice, the presence of the ignition key in the key cylinder is indicated by a high-level input at input terminal $I_7$ connected to the ignition key switch 232. If the input level at the input terminal $I_7$ is high, indicating that the ignition key is in the key cylinder, the user is judged to be in the vehicle. In this case, keyless entry operation is not to be performed and thus, control returns directly to the control program.

In the absence of the ignition key from the key cylinder the demand signal $S_{DM}$ is transmitted at a block 2003 in substantially the same manner as described with respect to the block 2201 of the first sub-routine. As set forth above, the transmission of the demand signal $S_{DM}$ continues for a predetermined period of time. The period for which the controller 200 remains in radio code signal transmitter mode is defined by a timer 276 in the microprocessor 222. After the predetermined period of time expires, the output level at the output terminal $O_2$ changed from low to high in order to open the switch terminal 258-Tr and to close the switch terminal 258-R. As a result, electrical communication between the switching circuit 246 and the modulator is blocked and the switching circuit 248 establishes electrical communication between the demodulator 260 and the latter. This switching procedure for switching the operation mode of the controller 200 may also be used in the foregoing first sub-routine and the subsequent third and sixth routines which will be discussed later.

After switching the operation mode of the controller from the radio code signal transmitter mode to receiver mode, reception of the unique code signal $S_{CD}$ from the radio code signal transmitter is checked for at a block 2004. This block 2004 is repeated until the unique code signal $D_{CD}$ is received.

In practice, if the unique code signal $S_{CD}$ is not received within a given waiting period, the keyless entry system would be reset to prevent endless looping. In this case, a theft-preventive counter may be incremented by one and an alarm may be produced when the counter value reaches a given value. This alarm procedure has been disclosed in the aforementioned co-pending U.S. patent application filed on the same date. This reception-mode time limit procedure should, in practice, be applied to all routines which await reception of the unique code-indicative signal $S_{CD}$ from radio code signal transmitter 100.

Upon reception of the unique code signal $S_{CD}$ at the block 2004, the preset code is retrieved from the code memory 264 through the multiplexer 266 at a block 2005. The received unique code is compared with the preset code at a block 2006. If the unique code does not match the preset code when compared in the block 2006, then the theft-preventing counter may be incremented by one as set forth above and control returns to the main program. On the other hand, if the unique code matches the preset code, then the input level at the input terminal $I_9$ is checked at a block 2007 to see if the door is locked or unlocked. If the input level at the input termianl $I_9$ is still high, indicating that the door is in locked, the control signal is then fed to the relay 240 to drive the reversible motor 302-D in the unlocking direction, at a block 2008. After this block 2008, control returns to the main program. On the other hand, when the input level at the input terminal $I_9$ is low when checked at the block 2007, then the relay 242 is energized at a block 2009 to drive the reversible motor 302-D in the locking direction.

Figure 8:
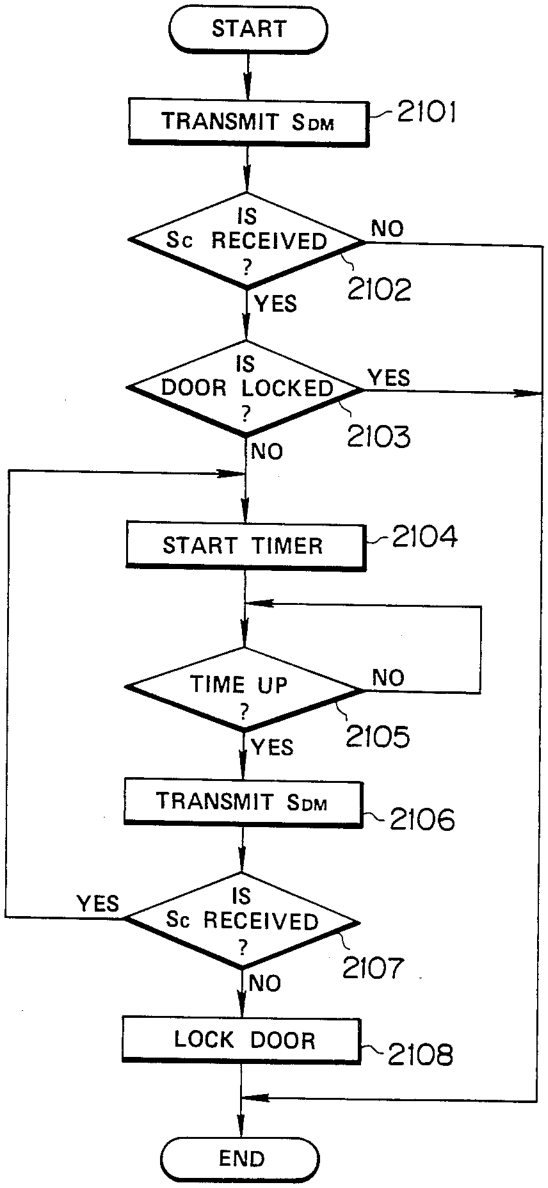
FIG. 8 is a flowchart of an automatic door locking program in the preferred embodiment of the keyless entry system according to the invention.

FIG. 8 shows the preferred embodiment of an automatic door locking program to be executed by the microprocessor 222 of the controller 200. As set forth above, in order to facilitate automatic door locking, the microprocessor 222 of the controller 200 periodically triggers the modulator 252 via the output terminal $O_1$ to transmit the radio demand signal $S_{DM}$ through the antennas 206-D and 210-D. The radio demand signal $S_{DM}$ continues for a given period of time. The microprocessor 222 then checks the input level at the input terminal $I_1$ and performs automatic door locking when the authorized user possessing the radio code signal transmitter 100 leaves the broadcasting range of the controller 200.

The program of FIG. 8 is executed at regular intervals. In each cycle of execution of the program, the output triggering the modulator 252 is output through the output terminal $O_1$ at a step 2101. Then, the input level at the input terminal $I_1$ is checked at the step 2102. If the input level at the input terminal $I_1$ checked at the step 2102 remains LOW for a given period, which indicates the absense of the transmitter 100 in the broadcasting range of the controller 200, the routine ends.

On the other hand, following a HIGH-level input at the input terminal $I_1$ when checked at the step 2102, the input level at the input terminal $I_9$ is checked at a step 2103. If the input level at the input terminal $I_9$ indicates that the door is locked, as detected by the door-lock-detecting switch 236, the routine ends.

On the other hand, if the input level at the input terminal $I_9$ indicates that the door in unlocked, the timer in the controller 200 is activated to start measuring elapsed time at a step 2104. The timer is designed to measure a predetermined period of time sufficient for the authorized user to leave the broadcasting range of the controller. Elapsed time is checked at a step 2105. This time-checking step 2105 is repreated until the aforementioned predetermined period of time expires. Once the time limit is reached at the step 2105, the output triggering the modulator 252 is again produced at the output terminal $O_1$ at a step 2106. Therefore, the radio demand signal $S_{DM}$ is again transmitted through the antennas 206-D and 210-D, at the step 2106. Thereafter the input level at the input terminal $i_1$ is again checked at a step 2107. If the input level at the input terminal $I_1$ remains HIGH when checked at the step 2107, and thus indicates that the radio code signal transmitter 100 is within the broadcasting range of the controller 200, control returns to the step 2104. In the step 2104, the timer is reset and re-triggered to start measuring elapsed time again.

The steps 2104, 2105, 2106 and 2107 are repeated until the input level at the input terminal $I_1$ goes LOW which indicates the absense of the radio code signal transmitter 100 within the broadcasting range of the controller 200. When a LOW-level input at the input terminal $I_1$ is detected, then the actuator relay 242 is energized to operate the actuator 302-D in the locking direction to lock the door, at a step 2108.

Therefore, the program of FIG. 8 can automatically lock the door upon detecting the absence of the radio code signal tramsitter 100 within the broadcasting range. This frees the authorized user of the door-locking operation.

Figure 9:
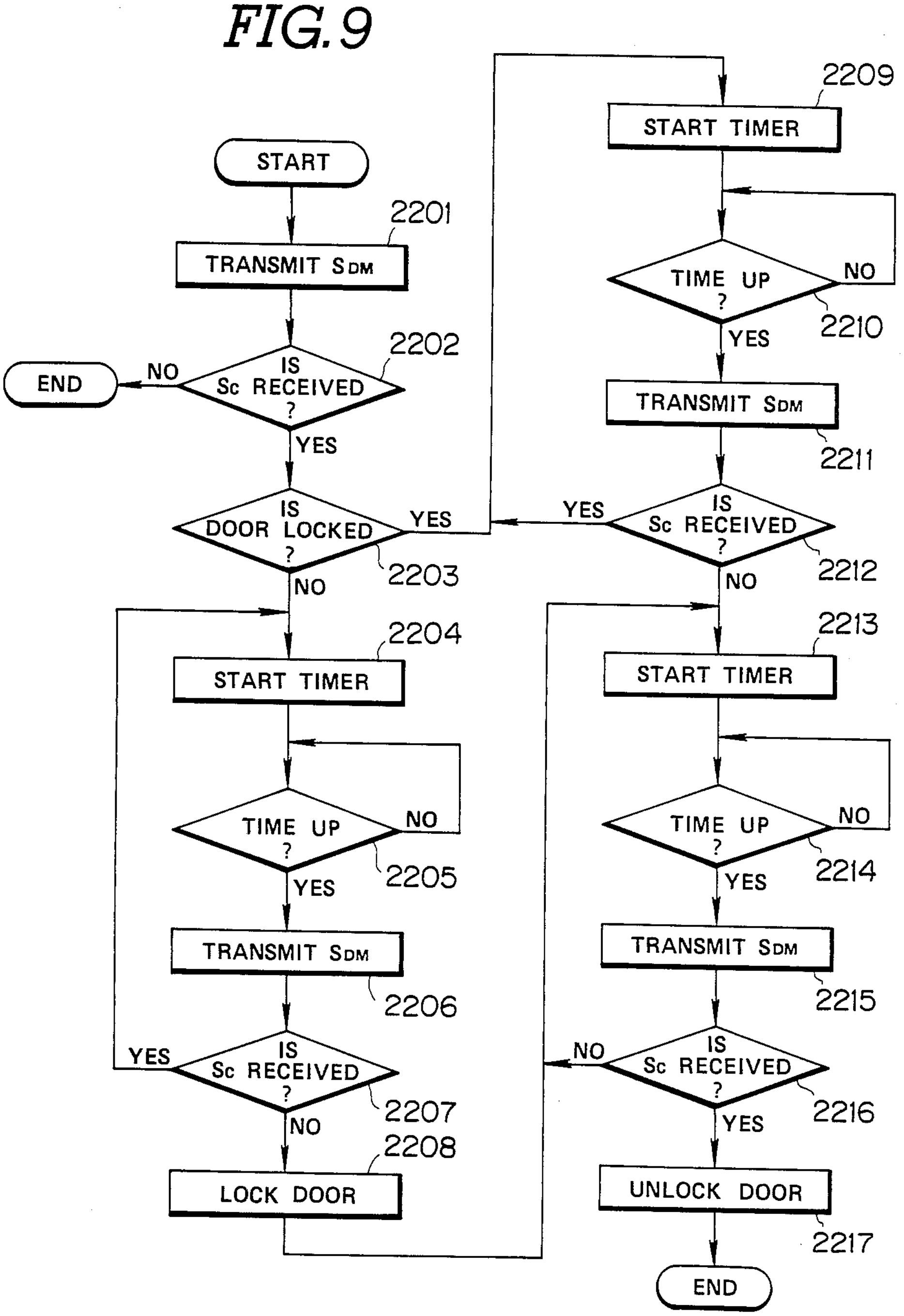
FIG. 9 is a flowchart of another embodiment of an automatic door locking and unlocking program to be performed in the controller of FIG. 5.

FIG. 9 is a modified version of FIG. 8, which facilitates automatic door locking and unlocking according to the absence or presence of the radio code signal transmitter 100 within the broadcasting range of the controller 200.

As in the program of FIG. 8, the program of FIG. 9 is executed at regular intervals. In each cycle of execution of the program, the output triggering the modulator 252 is output through the output terminal $O_1$ at a step 2201. Then, the input level at the input terminal $I_1$ is checked at the step 2202. If the input level at the input terminal $I_1$ when checked at the step 2202 remains LOW for a given period, which indicates the absense of the transmitter 100 in the broadcasting range of the controller 200, the routine ends.

On the other hand, in response to a HIGH-level input at the input terminal $I_1$ when checked at the step 2202, the input level at the input terminal $I_9$ is checked at a step 2203. If the input level at the input terminal $I_9$ indicates that the door is locked, the timer in the controller 200 is activated to start measuring elapsed time at a step 2204. The timer measures a predetermined period of time sufficient for the authorized user to leave the broadcasting range of the controller. Elapsed time is checked at a step 2205. This time-checking step 2205 is repeated until the predetermined period of time expires. Once the time limit is reached at the step 2205. Then, the output triggering the modulator 252 is again produced at the output terminal $O_1$ at a step 2206. Therefore, the radio demand signal $S_{DM}$ is again transmitted through the antennas 206-D and 210-D, at the step 2206. Thereafter the input level at the input terminal $i_1$ is again checked at a step 2207. If the input level at the input terminal $I_1$ remains HIGH when checked at the step 2207, and thus indicates that the radio code signal transmitter 100 is within the broadcasting range of the controller 200, control returns to the step 2204. In step 2204, the timer is reset and re-triggered to start measuring elapsed time again.

The steps 2204, 2205, 2206 and 2207 are repeated until the input level at the input terminal $I_1$ goes LOW which indicates the absense of the radio code signal transmitter 100 within the boradcasting range of the controller 200. If a LOW-level input at the input terminal $I_1$ is detected, then the actuator relay 242 is energized to operate the actuator 302-D in the locking direction to lock the door at a step 2208.

After locking the door at the satep 2208, control passes to a step 2213. The timer in the controller 200 is again activated to measure elapsed time at a step 2213. The timer is designed to measure a predetermined period of time sufficient for the authorized user to leave the broadcasting range of the controller. Elapsed time is checked at a step 2214. This time-checking step 2214 is repeated until the aforementioned predetermined period of time expires. Once the time limit is reached at the step 2214 the output triggering the modulator 252 is again produced at the output terminal $O_1$ at a step 2215. Therefore, the radio demand signal $S_{DM}$ is again transmitted through the antennas 206-D and 210-D, at the step 2215. Thereafter the input level at the input terminal $i_1$ is again checked at a step 2216. If the input level at the input terminal $I_1$ remains LOW when checked at the step 2216, and thus indicates that the radio code signal transmitter 100 is within the broadcasting range of the controller 200, control returns to the step 2213. In the step 2213, the timer is reset and re-triggered to start measuring elapsed time again.

The steps 2213, 2214, 2215 and 2216 are repeated until the input level at the input terminal $I_1$ goes HIGH which indicates the presense of the radio code signal transmitter 100 within the broadcasting range of the controller 200. If a HIGH-level input at the input terminal $I_1$ is detected, then the actuator relay 240 is energized to operate the actuator 302-D in the unlocking direction to unlock the door at a step 2217.

On the other hand, if the input level at the input terminal $I_9$ indicates that the door is locked when checked at the step 2203, then control passes to a step 2209. In the step 2209, the timer in the controller 200 is activated to measure elapsed time at a step 2209. Elapsed time is checked at a step 2210. This time-checking step 2210 is repeated until the predetermined period of time expires. Once the time limit is reached at the step 2210 the output triggering the modulator 252 is again produced at the output terminal $O_1$ at a step 2211. Therefore, the radio demand signal $S_{DM}$ is again transmitted through the antennas 206-D and 210-D, at the step 2211. Thereafter the input level at the input terminal $i_1$ is again checked at a step 2212. If the input level at the input terminal $I_1$ remains LOW when checked at the step 2212, control passes to the step 2213. On the other hand, if the input level at the input terminal $I_1$ remains HIGH, control returns to the step 2209 to repeat the steps 2209, 2210, 2211 and 2212.

As will be appreciated herefrom, the program of FIG. 9 fully automatically locks and unlocks the vehicle door.

Therefore, the invention fulfills all the objects and advantages sought therefor.

What is claimed is:

1. A keyless entry system for an automotive door lock comprising:

a door lock actuator for operating said door lock between a first locking position and a second unlocking position;

a pocket-portable radio code signal transmitter for transmitting a radio code signal containing a unique code which identifies said transmitter, said radio code signal transmitter being responsive to a radio demand signal to be activated to transmit said radio code signal; and a controller mounted on a vehicle and electrically connected to said door lock actuator for controlling operation of said actuator for operating said door lock between said first locking position and said second unlocking position, said controller cyclically and repeatedly transmitting said radio demand signal at a given timing, receiving said radio code signal transmitted from said radio code signal transmitter, comparing said unique code in the received radio code signal with a preset code for detecting the presence of an authorized transmitter in the vicinity of said controller by detecting whether said unique code matches said preset code at every occurrence of transmission of said radio demand signal, and operating said door lock actuator from said second door unlocking position to said first door locking position in response to an absence of said radio code signal at the occurrence of said radio demand signal.

2. A keyless entry system as set forth in claim 1, which further comprises a manually operable switch mounted on the external surface of a vehicle body and associated with said controller, said manually operable switch temporarily triggering said controller to transmit said radio demand signal irrespective of said given timing.

3. A keyless entry system as set forth in claim 1, which further comprises a detector for detecting a prdetermined disabling condition and disabling said keyless entry system when said predetermined disabling condition is detected.

4. A keyless entry system as set forth in claim 3, wherein said detector detects when an ignition key is in a key cylinder.

5. A keyless entry system as set forth in claim 1, which further comprises a timer for measuring elapsed time, said timer being reset and started periodically at a timing determined relative to transmission of said radio demand signal for measuring a given period of time, and wherein said controller operates said door lock actuator if said radio code signal is absent within said given period of time.

6. A keyless entry system as set forth in claim 1, wherein said controller is responsive to said radio code signal for operating said door lock actuator to actuate said door lock to said second unlocking position.

7. A keyless entry system as set forth in claim 6, wherein said controller controls said door lock actuator to hold said door lock in said second unlocking position while said radio code signal is present.

8. A keyless entry system for an automotive door lock comprising:

a door lock actuator for actuating said door lock between a first locking position and a second locking position;

a manually operable switch mounted on the external surface of a vehicle body for manual operation from outside of the vehicle;

a pocket-portable radio code signal transmitter for transmitting a radio code signal containing a a unique code which identifies said transmitter, said radio code signal transmitter being responsive to a radio demand signal to be activated to transmit said radio code signal;

a controller mounted on a vehicle and electrically connected to said door lock actuator for controlling operation of said actuator, said controller also being connected to said manually operable switch to sense manual operation of said manually operable switch, said controller regularly transmitting said radio demand signal at a given timing and being responsive to manual operation of said manually operable switch for temporarily transmitting said radio demand signal irrespective of said given timing, receiving said radio code signal transmitted by said radio code signal transmitter, comparing said unique code in the received radio code signal with a preset code to detect the presence of an authorized transmitter in the vicinity thereof by detecting said radio code signal containing said unique code matching with said preset code at every occurrence of transmission of said radio demand signal, to operate said door lock to said second unlocking position when said unique code and said preset code match, and to detect an absence of said radio code signal at the occurrence of said radio demand signal for detecting that said transmitter is out of a predetermined radio communication range and to operate said door lock actuator to hold said door lock in said first locking position while said radio code signal is absent in said predetermined radio communication range.

9. A keyless entry system as set forth in claim 8, which further comprises a detector for detecing a predetermined disabling condition and disabling said keyless entry system when said predetermined disabling condition is detected.

10. A keyless entry system as set forth in claim 9, wherein said detector detects when an ignition key is in a key cylinder.

11. A keyless entry system as set forth in claim 8, further comprising a time for measuring elapsed time, said timer being reset and started periodically at a timing determined relative to transmission of said radio demand signal for measuring a given period of time, and said controller operates said door lock actuator when said radio code signal is absent for said given period of time.

12. A keyless entry system as set forth in claim 8, wherein said controller is responsive to said radio code signal for operating said door lock actuator to operate said door lock to said second unlocking position.

13. A keyless entry system as set forth in claim 12, wherein said controller controls said door lock actuator to hold said door lock in said second unlocking position while said radio code signal is present.

14. An automatic operation system for a lock mechanism of a closure which operably closes an opening of an enclosed space defined within a vehicle, comprising:

a lock actuator associated with said closure for operating said lock mechanism between a first locking position and a second unlocking position;

a pocket-portable radio code signal transmitter transmitting a radio code signal containing a unique code which identifies said transmitter, said radio code signal transmitter being responsive to a radio demand signal to transmit said radio code signal;

a controller mounted on a vehicle and electrically connected to said lock actuator for operating said lock mechanism between said first locking position and said second unlocking position, said controller cyclically and repeatedly transmitting said radio demand signal at a given timing, receiving said radio code signal from said radio code transmitter, comparing said unique code in the received radio code signal with a preset code for detecting that an authorized transmitter is in the vicinity thereof by detecting said radio code signal containing said unique code matching with said preset code at every occurrence of transmission of said radio demand signal, and operating said lock actuator from said second unlocking position to said first locking position in response to an absence of said radio code signal at the occurrence of said radio demand signal.

15. An automatic operation system for a lock mechanism of a closure which operably closes an opening of an enclosed space defined within a vehicle, comprising:

a lock actuator for operating said door lock between a first locking position and a second unlocking position;

a manually operable switch mounted on the external surface of a vehicle body for manual operation from outside of the vehicle and within a predetermined communication range defined in the vicinity of said closure;

a pocket-portable radio code signal transmitter transmitting a radio code signal containing a unique code which identifies said transmitter, said radio code signal transmitter being responsive to a radio demand signal to be activated to transmit said radio code signal;

a controller mounted on a vehicle and electrically connected to said lock actuator for controlling operation of said actuator for operating said lock mechanism between said first locking position and said second unlocking position, said controller regularly transmitting said radio demand signal at a given timing and being responsive to manual operation of said manually operable switch for temporarily transmitting said radio demand signal irrespective of said given timing, receiving said radio code signal from said radio code transmitter at every occurrence of said radio demand signal, comparing said unique code in the received radio code signal with a preset code for detecting the presence of an authorized transmitter in the vicinity thereof by detecting said radio code signal containing said unique code matching with said preset code at every occurrence of transmission of said radio demand signal, to operate said lock mechanism to said second unlocking position when said unique code and said preset code match, and for detecting an absence of said radio code signal at the occurrence of said radio demand signal for detecting said transmitter being out of said predetermined radio communication range and to operate said lock actuator to hold said door lock at said first locking position while said radio code signal is absent in said predetermined radio communication range.

16. An automatic operation system for a lock mechanism of a closure which operably closes an opening of an enclosed space defined within a vehicle, comprising:

a lock actuator associated with said closure for operating said lock mechanism between a first locking position and a second unlocking position;

a pocket-portable radio code signal transmitter transmitting a radio code signal containing a unique code which identifies an authorized transmitter, said radio code signal transmitter being responsive to a radio demand signal to be activated to transmit said radio code signal;

a controller mounted on a vehicle and electrically connected to said lock actuator for controlling operation of said actuator for operating said lock mechanism between said first locking position and second unlocking position, said controller cyclically and repeatedly transmitting said radio demand signal at a given timing, receiving said radio code signal from said radio code transmitter, detecting said authorized transmitter which transmits said radio code signal matching with said preset code in the vicinity of said closure by detecting said radio code signal containing said unique code matching with said preset code at every occurrence of transmission of said radio demand signal and holding said lock mechanism at said second unlocking position while said authorized transmitter is present in the vicinity of said closure, and detecting said authorized transmitter moving away from said closure for operating said lock actuator from said second unlocking position to said first locking position by detecting an absence of said radio code signal at the occurrence of said radio demand signal for operating said lock mechanism to said first locking position.

17. An automatic operation system for a lock mechanism of a closure which operably closes an opening of an enclosed space defined within a vehicle, comprising:

a lock actuator for operating said door lock between a first locking position and a second unlocking position;

a pocket-portable radio code signal transmitter transmitting a radio code signal containing a unique code which identifies an authorized transmitter, said radio code signal transmitter being responsive to a radio demand signal to be activated to transmit said radio code signal;

a controller mounted on a vehicle and electrically connected to said lock actuator for controlling operation of said actuator for operating said lock mechanism between said first locking position and said second unlocking position, said controller regularly transmitting said radio demand signal at a given timing, receiving said radio code signal from said radio code transmitter at every occurrence of said radio demand signal, comparing said unique code in the received radio code signal with a preset code to detect the presence of an authorized transmitter in the vicinity thereof by detecting said radio code signal containing said unique code matching with said preset code at every occurrence of transmission of said radio demand signal, to operate said lock mechanism to said second unlocking position when said unique code and said preset code match, and for detecting an absence of said radio code signal at the occurrence of said radio demand signal for detecting said transmitter being out of said predetermined radio communication range so as to operate said lock actuator to hold said door lock at said first locking position while said radio code signal is absent in said predetermined radio communication range.

18. An automatic operation system for a vehicular device comprising:

an actuator associated with said vehicular device between a first active position and a second not inactive position;

a pocket-portable radio code signal transmitter transmitting a radio code signal containing a unique code which identifies said transmitter, said radio code signal transmitter being responsive to a radio demand signal to be activated to transmit said radio code signal;

a controller mounted on a vehicle and electrically connected to said actuator for controlling operation of said actuator for operating said vehicular device between said first position and said second position, said controller cyclically and repeatedly transmitting said radio demand signal at a given timing, receiving said radio code signal from said radio code transmitter, comparing said unique code in the received radio code signal with a preset code for detecting the presence of an authorized transmitter in the vicinity thereof by detecting said radio code signal containing said unique code matching with said preset code at every occurrence of transmission of said radio demand signal, and operating said lock actuator from said second position to said first position in response to an absence of said radio code signal at the occurrence of said radio demand signal.

19. An automatic operation system for a vehicular device comprising:

an actuator for operating said vehicular device between a first active position and a second inactive position;

a manually operable switch mounted on the external surface of a vehicle body for manual operation from outside of the vehicle and within a predetermined communication range defined in the vicinity of said closure;

a pocket-portable radio code signal transmitter transmitting a radio code signal containing a unique code which identifies said transmitter, said radio code signal transmitter being responsive to a radio demand signal to be activated to transmit said radio code signal;

a controller mounted on a vehicle and electrically connected to said actuator for controlling operation of said actuator for operating said vehicular device between said first position and said second position, said controller regularly transmitting said radio demand signal at a given timing and being responsive to manual operation of said manually operable switch for temporarily transmitting said radio demand signal irrrespective of said given timing, receiving said radio code signal from said radio code transmitter at every occurrence of said radio demand signal, comparing said unique code in the received radio code signal with a preset code to detect the presence of an authorized transmitter in the vicinity thereof by detecting said radio code signal containing said unique code matching with said preset code at every occurrence of transmission of said radio demand signal, to operate said vehicular device to said second position when said unique code and said preset code match, and for detecting an absence of said radio code signal at the occurrence of said radio demand signal for detecting said transmitter out of said predetermined radio communication range so as to operate said actuator to hold said lock at said first position while said radio code signal is absent in said predetermined radio communication range.

20. An automatic operation system for a vehicular device comprising:

an actuator associated with said vehicular device between a first active position and a second inactive position;

a pocket-portable radio code signal transmitter transmitting a radio code signal containing a unique code which identifies an authorized transmitter, said radio code signal transmitter being responsive to a radio demand signal to be activated to transmit said radio code signal;

a controller mounted on a vehicle and electrically connected to said actuator for controlling operation of said actuator for operating said vehicular device between said first position and said second position, said controller cyclically and repeatedly transmitting said radio demand signal at a given timing, receiving said radio code signal from said radio code transmitter, detecting said authorized transmitter which transmits said radio code signal matching with said preset code in the vicinity of said closure by detecting said radio code signal containing said unique code matching with said preset code at every occurrence of transmission of said radio demand signal and holding said vehicular device at said second position while said authorized transmitter is present in the vicinity of said closure, and detecting said authorized transmitter moving away from said closure for operating said lock actuator from said second position to said first locking position by detecting an absence of said radio code signal at the occurrence of said radio demand signal for operating said vehicular device to said first position.

21. An automatic operation system for a vehicular security device comprising:

a lock actuator for operating said vehicular device between a first security active position and a second security inactive position;

a pocket-portable radio code signal transmitter transmitting a radio code signal containing a unique code which identifies an authorized transmitter, said radio code signal transmitter being responsive to a radio demand signal to be activated to transmit said radio code signal;

a controller mounted on a vehicle and electrically connected to said lock actuator for controlling operation of said actuator for operating said vehicular device between said first position and said second position, said controller regularly transmitting said radio demand signal at a given timing, receiving said radio code signal from said radio code transmitter at every occurrence of said radio demand signal, comparing said unique code in the received radio code signal with a preset code to operate said actuator for detecting said transmitter matching therewith in the vicinity thereof by detecting said radio code signal containing said unique code matching with said preset code at every occurrence of transmission of said radio demand signal, to operate said vehicular device to said second position when said unique code and said preset code match, and for detecting an absence of said radio code signal at the occurrence of said radio demand signal for detecting said transmitter being out of said predetermined radio communication range so as to operate said lock actuator to hold said vehicular device at said first position while said radio code signal is absent in said predetermined radio communication range.

* * * * *